(No Model.)
C. VAN WORMER.
MOLE AND GOPHER TRAP.
No. 388,515. Patented Aug. 28, 1888.
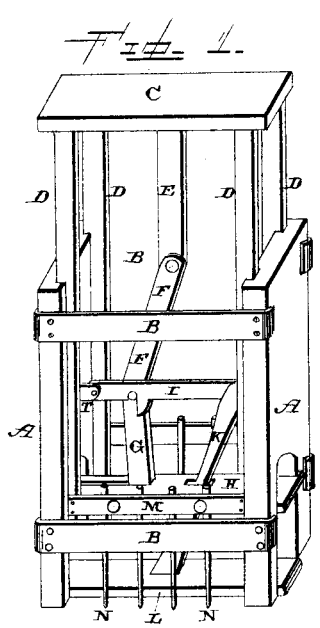
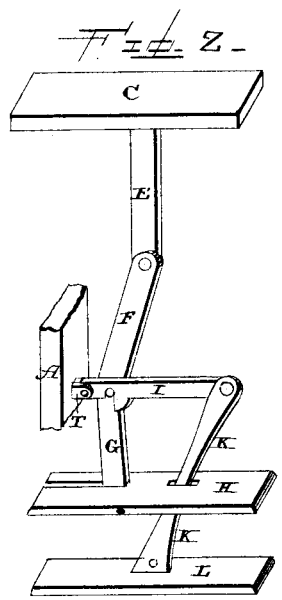
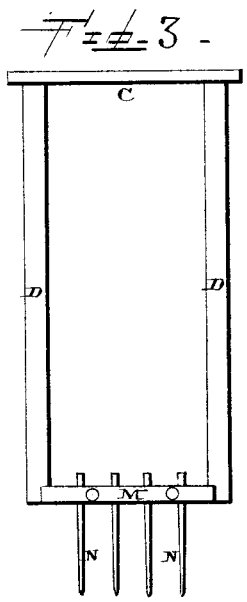
Witnesses
Edm. P. Ellis.
F. T. Chapman
Inventor
Chas Van Wormer
per F. A. Lehmann,
Atty.

UNITED STATES PATENT OFFICE.

CHARLES VAN WORMER, OF AUBURN, INDIANA.

MOLE AND GOPHER TRAP.

SPECIFICATION forming part of Letters Patent No. 388,515, dated August 28, 1888.

Application filed June 9, 1887. Serial No. 240,848. (No model.)

*To all whom it may concern:*

Be it known that I, CHARLES VAN WORMER, a citizen of the United States, residing at the town of Auburn, in the county of De Kalb, in the State of Indiana, have invented a new and useful Mole and Gopher Trap, (which has not been patented in any country or countries,) of which the following is a specification.

My invention relates to an improvement in mole and gopher traps; and the object is to provide a trap which when tripped by the movement of the animal beneath it will cause a weighted platform to descend and impale the animal.

Figure 1 is a perspective of a trap which embodies my invention complete. Fig. 2 is a detached view of the operating mechanism alone. Fig. 3 is an end view of the weighted frame provided with impalement-points.

A B represent a suitable frame, which is to be placed in an upright position upon the ground, and which has its end pieces, A, grooved upon their inner sides, so as to receive the slides D, which have the platform C secured to their upper ends. Upon this platform C is placed a weight of any kind for the purpose of forcing the impalement-points N, which are secured to the lower ends of the parts D by the plates M, into the animal below. There may be any desired number of points N, and they may be secured to the parts D in any suitable manner.

Projecting downward from the under side of the platform C is a hanger, E, and pivoted to the lower end of this hanger E are the knuckle-bars F, which are connected at their lower ends to a single knuckle-bar, G, which is pivoted at its lower end to the center of the adjusting-slide H, which is slotted at one end, so as to allow the bar G to sink into the slot when the knuckle-bars are closed. The slide H is passed horizontally into or through the frame A B, and can be adjusted in either direction.

Pivoted to one end of the frame at T is the latch I, which is provided with a notch on its under side, so as to catch over the pivotal pin which unites the knuckle-joints F G together. The outer free end of the latch I is pivoted to the curved rod K, which extends downward through an opening in the adjusting-slide H and to the trip L.

The animal passing under the trip L so as to raise it slightly, causes the latch I to be raised from the projecting pivot at the center of the knuckle-bars F G, relieving the slides D on either side, which are then forced downward by the weight on the platform C, the knuckle-bar G being made to close between the two bars F, and also in the slot, which is made in the adjusting-slide H, the points N being forced downward a suitable distance below the lower end of the frame A B, so as to impale the animal underneath. These impalement-points, being held between the lower end of the slide D and the plates M, can be adjusted so as to extend any suitable distance downward. The projection in the latch I by catching over the projecting pivotal point prevents the bars F G from being closed together, and hence supports the slides and the weighted platform in a raised position. In setting the trap the platform C and the slides D are raised until the pivotal pin catches in the notch in the latch I, when the trap is ready for use. If the trap is set over the hill of a mole, and the animal passes back through the hill, its upward pressure against the trip L releases the latch from the pin, and then the weighted platform descends and drives the points N into the animal. If the trap is set over the hole of a gopher or other burrowing animal, the attempt of the animal to get out of the hole will release the latch and cause the points N to be driven into its head.

One great advantage of the construction here shown consists in being able to see whether the trap has been sprung from a distance and thus saving the necessity of going to examine it. As long as the platform C and weight are seen to be in a raised position, a person knows at once that the trap has not been sprung and that there is no necessity of going to inspect it.

The operation of the trap is as follows: Take hold of the platform and lift the trip up with it and the bars F G will automatically straighten out until the pivotal pin catches in the recesses in the under edge of the latch. The points N should be on a level with the bottom of the outside frame, and then these points will penetrate the ground a distance equal to the movement of the platform and slides when the trip is sprung. The ground should be pressed down at the place where the trap is to be set, so as to form a level place where the trip is to rest upon the ground. The points N should be directly over the burrow or hill and at right angles to it. A heavy weight having been placed upon the platform, the trap is ready for use. If a heavy weight is required for hard soils, the slide H should be moved until the bars F and G are nearly perpendicular, and this position will relieve the strain on the latch I, and the trap is more easily sprung. The slide H is made adjustable, so that the pivot at the lower end of the bar G can be moved more or less into a line with the lower end of the hanger E, and the nearer this point is moved into a line with the hanger E the more nearly the bars F and G will be brought into a straight line when the trap is set and the higher the weight will be raised by the platform.

Having thus described my invention, I claim—

The combination of the frame A, provided with a cross-piece, H, the vertically-movable and weighted frame C D, provided with spikes at its lower end and placed inside of the one A, the hanger E, secured at its upper end to the frame, the toggle-levers F G, loosely fastened to the hanger E at one end and to the stationary cross-piece H of the frame A at the other, the latch I, pivoted to the frame A at one end and made to catch over a pin on the levers, the connecting-rod K, fastened to the latch I at one end, and the tripping device fastened to the lower end of the rod K, substantially as shown.

In testimony whereof I affix my signature in the presence of three witnesses.

CHARLES VAN WORMER.

Witnesses:
 CHARLES WELLS,
 THOMAS A. COOLEY,
 FRANK M. POWERS.